March 3, 1959     D. P. CIACCIO     2,876,130
PROCESS FOR BRIGHTENING SUEDE
Filed Dec. 21, 1955
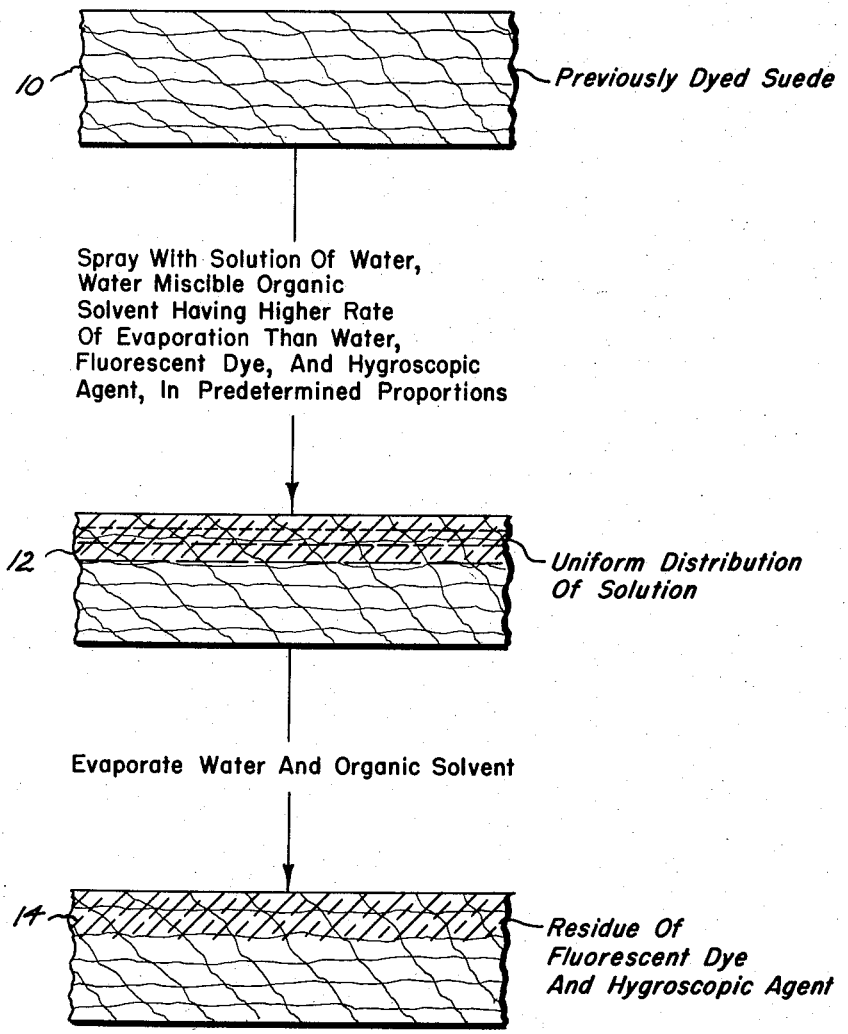

2,876,130

PROCESS FOR BRIGHTENING SUEDE

Dominic P. Ciaccio, Dorchester, Mass., assignor to Palco Chemical Company, Charlestown, Mass., a corporation of Massachusetts Application December 21, 1955, Serial No. 554,393

9 Claims. (Cl. 117—33.5)

The present invention relates to processes for enhancing the appearance of suede and, more particularly, to processes for intensifying the brightness of suede shoes, handbags, etc., which have been dulled or otherwise discolored by handling in production, shipment or sale, or by scuffing in use.

The primary object of the present invention is to provide a novel process for intensifying the brightness of suede by spraying it with a composition comprising, in predetermined proportions, a dispersion of a fluorescent dye and a hygroscopic agent in a volatile vehicle of water and an organic solvent. Evaporation of the vehicle leaves on the suede a residue of the fluorescent dye and the hygroscopic agent which together have been found to brighten the suede to an unusual degree for a prolonged period. The nap of the suede is preserved by the non-viscous vehicle which uniformly deposits the fluorescent dye and the hygroscopic agent and dries without coagulation.

Other objects of the present invention will in part be obvious and will in part appear hereinafter.

The invention accordingly comprises the process involving the several steps and the relation and order of one or more of such steps with respect to each of the others, which are exemplified in the following detailed disclosure taken in connection with the accompanying drawing, and the scope of which will be indicated in the appended claims.

The single sheet of drawings is a flow diagram of the procedural steps followed in practicing the invention.

The herein specifically described process of the present invention, as shown in the drawing, is concerned with restoring the brightness of previously dyed suede, designated by 10, by spraying it with a solution, designated by 12, containing a fluorescent dye, preferably itself colorless, that emits visible light when subjected to ultraviolet radiation, a hygroscopic agent that by its own weight retains at least 10% of water when in air at 40% relative humidity and 20 to 22° C., water and water-miscible organic solvent having a higher rate of evaporation than water. When the water and organic solvent are evaporated, a residue designated by 14, of the fluorescent dye and the hygroscopic agent remains. When the vehicle contains too much organic solvent, it tends to weaken plastic binders in the article to which the solution is applied. On the other hand, when the vehicle contains too little of the organic solvent, it will not sufficiently penetrate the suede or evaporate rapidly enough. Accordingly, the solution preferably contains a surface active agent, e. g., a surface tension reducing agent, which cooperates with the organic solvent and water to achieve adequate penetration while permitting a desirable balance to be reached between the water and the organic solvent. In one form a single component serves both as a hygroscopic agent and a surface active agent.

The dye is most effective in the range of from .005 to 1.0% of the total weight of the composition. In accordance with the present invention, when the dye is within the foregoing range, the hygroscopic agent is operative in the range of from 0.5 to 10.0% of the total weight of the composition. For best results, the water should range from 20 to 80% and the organic solvent from 80 to 20% of the combined weight of the water and the organic solvent.

The many substantially colorless fluorescent dyes useful in accordance with the present invention include, for example: cumarin derivatives such as 7-hydroxyl-4 methyl cumarin ($\beta$-methyl umbelliferone) and 7-dimethylamino-4 methyl cumarin; hydroxy and amino derivatives of cinnamic acid such as 2-hydroxy-cinnamic acid and 2-amino-cinnamic acid; and anthracene and related compounds such as 9-phenyl anthracene, anthracene-1,5-disulfonic acid, phenanthrene and pyrene.

In one form, the hygroscopic agent is a polyhydroxy compound such as glycerol, ethylene or propylene glycol, triethanolamine or sorbitol. In another form, the hygroscopic agent is a surface active agent as well, for example, is an alkyl phenoxy polyoxyethylene ethanol such as the condensation product of p-iso-octyl phenol and ethylene oxide sold by General Dyestuff under the trade-name Igepal, or a polyoxyethylene ether of a hydroxy fatty acid such as the condensation product of a hydroxy substituted fatty acid with ethylene oxide sold by General Dyestuff under the trade-name Emulphor. Preferably, the hygroscopic agent is soluble in water to the extent of at least 20% by total weight of the solution at 20 to 22° C.

Examples of organic solvents that are water miscible and have a higher rate of evaporation than water are the lower alcohols such as methanol and ethanol and the lower ketones such as acetone and methyl ethyl ketone.

The following non-limiting examples further illustrate the present invention.

Example I

A series of previously dyed suede shoes were sprayed with the following solution:

| | Parts by weight |
|---|---|
| Ethyl alcohol | 43.30 |
| $\beta$-Methyl umbelliferone | .03 |
| Igepal (C. A. conc.) | 3.22 |
| Water | 53.45 |

The shoes were air dried until dynamic balance between moisture in the atmosphere and moisture retained in the suede was reached. There resulted a sharp increase in the brightness of the suede which did not appreciably lessen for a week, at the end of which the test was considered complete.

Example II

A similar result was obtained by repeating the process of Example I with the following formulation:

| | Parts by weight |
|---|---|
| Ethyl alcohol | 45.74 |
| $\beta$-Methyl umbelliferone | .02 |
| Glycerine | 8.50 |
| Water | 45.74 |

Example III

Shoes treated in accordance with Examples I and II, at intervals of two, four, twenty-four and thirty-two hours after spraying were compared with shoes similarly treated with the following formulation:

| | Parts by weight |
|---|---|
| Ethyl alcohol | 45.74 |
| $\beta$-Methyl umbelliferone | .02 |
| Lauryl pyridinium laurate | .02 |
| Water | 54.22 |

It will be noted that none of the foregoing materials is hygroscopic. At each comparison it was found that shoes sprayed with the formulations specified in Examples I and II were distinctly brighter than shoes sprayed with the formulation specified in Example III which virtually reverted to their previous brightness in about two hours after spraying.

The process of the present invention was first disclosed in U. S. patent application Ser. No. 274,299, filed February 29, 1952 for Composition for Application to Suede, and now abandoned.

Since certain changes may be made in the above process without departing from the scope of the invention herein involved, it is intended that all matter contained in the above description shall be interpreted in an illustrative and not in a limiting sense.

I claim as my invention:

1. The process of spraying suede with a composition comprising water, a water miscible organic solvent having a higher rate of evaporation than water, a fluorescent dye and a hygroscopic component that by its own weight retains at least 10% of water when in air at 40% relative humidity and 20 to 22° C., the water ranging from 20 to 80% and the organic solvent ranging from 80 to 20% of the combined weight of the water and the organic solvent, the dye ranging from 0.005 to 1.5% and the hygroscopic component ranging from 0.5 to 10.0% of the total weight of the composition.

2. The process of claim 1 wherein the hygroscopic component is soluble in water at least in the amount of 20% of the combined weight of the hygroscopic component and water.

3. The process of claim 1 wherein said hygroscopic component is a surface active agent.

4. The process of spraying suede with a composition comprising water, a water miscible organic solvent having a higher rate of evaporation than water, a fluorescent dye and a hygroscopic component that by its own weight retains at least 10% of water when in air at 40% relative humidity and 20 to 22° C., the water ranging from 20 to 80% and the organic solvent ranging from 80 to 20% of the combined weight of the water and the organic solvent, the dye ranging from 0.005 to 1.5% and the hygroscopic component ranging from 0.5 to 10.0% of the total weight of the composition, and drying the composition to provide a residue of the fluorescent dye and the hygroscopic component for brightening the suede.

5. The process of spraying suede with a solution comprising water, a water miscible organic solvent having a higher rate of evaporation than water, a fluorescent dye that emits visible light when subjected to ultraviolet light and an organic hygroscopic component that by its own weight retains at least 10% of water when in air at 40% relative humidity and 20 to 22° C., the water ranging from 20 to 80% and the organic solvent ranging from 80 to 20% of the combined weight of the water and the organic solvent, the dye ranging from 0.005 to 1.5% and the hygroscopic component ranging from 0.5 to 10.0% of the total weight of the solution.

6. The process of claim 5 wherein the hygroscopic component is soluble in water at least in the amount of 20% of the combined weight of the hygroscopic component and water.

7. The process of spraying suede with a solution comprising water, a water miscible organic solvent having a higher rate of evaporation than water, a fluorescent dye that emits visible light when subjected to ultraviolet light and an organic hygroscopic component that by its own weight retains at least 10% of water when in air at 40% relative humidity and 20 to 22° C., the water ranging from 20 to 80% and the organic solvent ranging from 80 to 20% of the combined weight of the water and the organic solvent, the dye ranging from 0.005 to 1.5% and the hygroscopic component ranging from 0.5 to 10.0% of the total weight of the solution, and drying the solution by evaporating the water and the organic solvent to provide a residue of the fluorescent dye and the hygroscopic component for brightening the suede.

8. The process of claim 7 wherein said solution contains a surface active agent.

9. The process of claim 7 wherein said hygroscopic component is a surface active agent.

References Cited in the file of this patent

UNITED STATES PATENTS

| Number | Name | Date |
|---|---|---|
| 2,089,413 | Paine et al. | Aug. 10, 1937 |
| 2,267,758 | Sell | Dec. 30, 1941 |
| 2,334,348 | Miglarese | Nov. 16, 1943 |
| 2,341,009 | Axelrad | Feb. 8, 1944 |
| 2,528,324 | Thomas | Oct. 31, 1950 |
| 2,790,736 | McLaughlin et al. | Apr. 30, 1957 |